(12) United States Patent
Balzer et al.

(10) Patent No.: US 10,508,549 B2
(45) Date of Patent: Dec. 17, 2019

(54) GAS TURBINE ENGINE AIRFOIL WITH LARGE THICKNESS PROPERTIES

(71) Applicant: United Technologies Corporation, Hartford, CT (US)

(72) Inventors: Wolfgang Balzer, Manchester, CT (US); Thomas J. Praisner, Colchester, CT (US); Atul Kohil, Tolland, CT (US); Mark F. Zelesky, Bolton, CT (US); Dominic J. Mongillo, Jr., West Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1039 days.

(21) Appl. No.: 14/728,514

(22) Filed: Jun. 2, 2015

(65) Prior Publication Data

US 2015/0354365 A1    Dec. 10, 2015

Related U.S. Application Data

(60) Provisional application No. 62/008,626, filed on Jun. 6, 2014.

(51) Int. Cl.
| | |
|---|---|
| *F01D 5/14* | (2006.01) |
| *F01D 5/02* | (2006.01) |
| *F01D 5/18* | (2006.01) |

(52) U.S. Cl.
CPC ............ *F01D 5/141* (2013.01); *F01D 5/02* (2013.01); *F01D 5/186* (2013.01);
(Continued)

(58) Field of Classification Search
CPC .................................. F01D 5/02; F01D 5/141
See application file for complete search history.

(56) References Cited

U.S. PATENT DOCUMENTS

| | | | |
|---|---|---|---|
| 2,258,793 A | * 10/1941 | New ..................... | F01D 5/142 415/181 |
| RE23,108 E | 5/1949 | Stalker | |

(Continued)

FOREIGN PATENT DOCUMENTS

| | | | | |
|---|---|---|---|---|
| EP | 2383434 A2 | * 11/2011 | ............. | F01D 5/141 |
| GB | 2381298 | 4/2003 | | |
| GB | 2381298 A | * 4/2003 | ............. | F01D 5/141 |

OTHER PUBLICATIONS

Extended European Search Report for Application No. 15170835.1 dated Oct. 30, 2015.

*Primary Examiner* — Woody A Lee, Jr.
(74) *Attorney, Agent, or Firm* — Carlson, Gaskey & Olds, P.C.

(57) ABSTRACT

An airfoil for a gas turbine engine includes an airfoil with pressure and suction sides that are joined at leading and trailing edges. The airfoil extends a span from a support to an end in a radial direction. 0% span and 100% span positions respectively correspond to the airfoil at the support and at the end. The leading and trailing edges are spaced apart from one another an axial chord in an axial direction. A cross-section of the airfoil at a span location has a diameter tangent to the pressure and suction sides. The diameter corresponds to the largest circle fitting within the cross-section. A ratio of the diameter to the axial chord is at least 0.4 between 50% and 95% span location.

15 Claims, 4 Drawing Sheets

(52) U.S. Cl.
CPC ...... *F05D 2220/32* (2013.01); *F05D 2250/10* (2013.01); *F05D 2260/202* (2013.01); *Y02T 50/672* (2013.01); *Y02T 50/673* (2013.01)

(56) References Cited

U.S. PATENT DOCUMENTS

| | | | | |
|---|---|---|---|---|
| 2,563,269 A * | 8/1951 | Price | ..................... | F01D 5/085 |
| | | | | 415/115 |
| 2,597,510 A * | 5/1952 | McBride | ................ | F01D 5/145 |
| | | | | 415/115 |
| 3,475,108 A * | 10/1969 | Zickuhr | ................ | F01D 5/141 |
| | | | | 415/194 |
| 3,496,799 A * | 2/1970 | Call | ....................... | F16C 15/00 |
| | | | | 416/244 A |
| 4,431,376 A | 2/1984 | Lubenstein et al. | | |
| 6,264,428 B1 * | 7/2001 | Dailey | ................... | F01D 5/187 |
| | | | | 415/115 |
| 6,533,545 B1 * | 3/2003 | Hirano | ................... | F01D 5/141 |
| | | | | 415/191 |
| 6,899,524 B1 * | 5/2005 | Tangler | ................ | F04D 29/384 |
| | | | | 416/223 R |
| 8,075,259 B2 | 12/2011 | Praisner et al. | | |
| 8,152,459 B2 | 4/2012 | Sonoda et al. | | |
| 8,366,392 B1 * | 2/2013 | Liang | ..................... | F01D 5/147 |
| | | | | 416/96 A |
| 2001/0036401 A1 * | 11/2001 | Harvey | .................. | F01D 5/145 |
| | | | | 415/115 |
| 2010/0143139 A1 * | 6/2010 | Pandey | .................. | F01D 5/143 |
| | | | | 416/179 |
| 2010/0284801 A1 * | 11/2010 | Greim | ..................... | F01D 5/141 |
| | | | | 415/182.1 |
| 2011/0016883 A1 * | 1/2011 | Clemen | .................. | F01D 9/00 |
| | | | | 60/796 |
| 2012/0163988 A1 * | 6/2012 | Power | ..................... | F01D 5/141 |
| | | | | 416/243 |
| 2014/0119942 A1 * | 5/2014 | Lehmann | ................ | F01D 5/20 |
| | | | | 416/241 R |
| 2016/0010560 A1 * | 1/2016 | Dierksmeier | ........... | F01D 5/085 |
| | | | | 60/772 |

* cited by examiner

GAS TURBINE ENGINE AIRFOIL WITH LARGE THICKNESS PROPERTIES

CROSS-REFERENCE TO RELATED APPLICATIONS

This application claims priority to U.S. Provisional Application No. 62/008,626 which was filed on Jun. 6, 2014 and is incorporated herein by reference.

BACKGROUND

This disclosure relates to a gas turbine engine airfoil. More particularly, this disclosure relates to a gas turbine engine airfoil having a large thickness property for use in turbine blades, for example.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The thickness of an airfoil designed for turbomachinery applications is an important characteristic. It is often a result of multidisciplinary considerations including aerodynamics, durability, structure and design. However, recent advances in the design of aerodynamically high-performing, high-pressure turbine blades, particularly at the tip, have caused increased difficulties in the design of blades.

SUMMARY

In one exemplary embodiment, an airfoil for a gas turbine engine includes an airfoil with pressure and suction sides that are joined at leading and trailing edges. The airfoil extends a span from a support to an end in a radial direction. 0% span and 100% span positions respectively correspond to the airfoil at the support and at the end. The leading and trailing edges are spaced apart from one another an axial chord in an axial direction. A cross-section of the airfoil at a span location has a diameter tangent to the pressure and suction sides. The diameter corresponds to the largest circle fitting within the cross-section. A ratio of the diameter to the axial chord is at least 0.4 between 50% and 95% span location.

In a further embodiment of the above, a root supports a platform that corresponds to the support. The end provides a terminal end of the airfoil.

In a further embodiment of any of the above, the root includes a fir tree.

In a further embodiment of any of the above, the ratio is at least 0.45, but does not exceed 0.7.

In a further embodiment of any of the above, the ratio is at least 0.5, but does not exceed 0.65.

In a further embodiment of any of the above, the span location is between 50% and 70%.

In a further embodiment of any of the above, the ratio of the airfoil pitch to the axial chord is at least 1.6 at 60% span.

In a further embodiment of any of the above, the span location is between 75% and 95%.

In a further embodiment of any of the above, the ratio of the airfoil pitch to the axial chord is at least 1.8 at 80% span.

In a further embodiment of any of the above, the airfoil is a turbine blade.

In a further embodiment of any of the above, the airfoil includes cooling holes provided on at least one of the leading edge and the pressure side.

In another exemplary embodiment, a gas turbine engine includes a compressor section and a turbine section. A circumferential array of airfoils is provided in one of the compressor and turbine sections. The array has an airfoil that includes pressure and suction sides joined at leading and trailing edges. The airfoil extends a span from a support to an end in a radial direction. 0% span and 100% span positions respectively correspond to the exterior wall at the support and the end. The leading and trailing edges are spaced apart from one another an axial chord in an axial direction. A cross-section of the airfoil at a span location has a diameter tangent to the pressure and suction sides. The diameter corresponds to the largest circle fitting within the cross-section. A ratio of the diameter to the axial chord is at least 0.45 at a 50% span location or greater.

In a further embodiment of the above, the airfoil is provided in the turbine section.

In a further embodiment of any of the above, the airfoil is a turbine blade.

In a further embodiment of any of the above, the ratio is at least 0.45, but does not exceed 0.7.

In a further embodiment of any of the above, the ratio is at least 0.5, but does not exceed 0.65.

In a further embodiment of any of the above, the ratio of the airfoil pitch to the axial chord is between 1.5 and 1.9.

In a further embodiment of any of the above, the ratio of the airfoil pitch to the axial chord is between 1.65 and 1.8.

In a further embodiment of any of the above, the span location is between 50% and 70%.

In a further embodiment of any of the above, the span location is between 75% and 95%.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
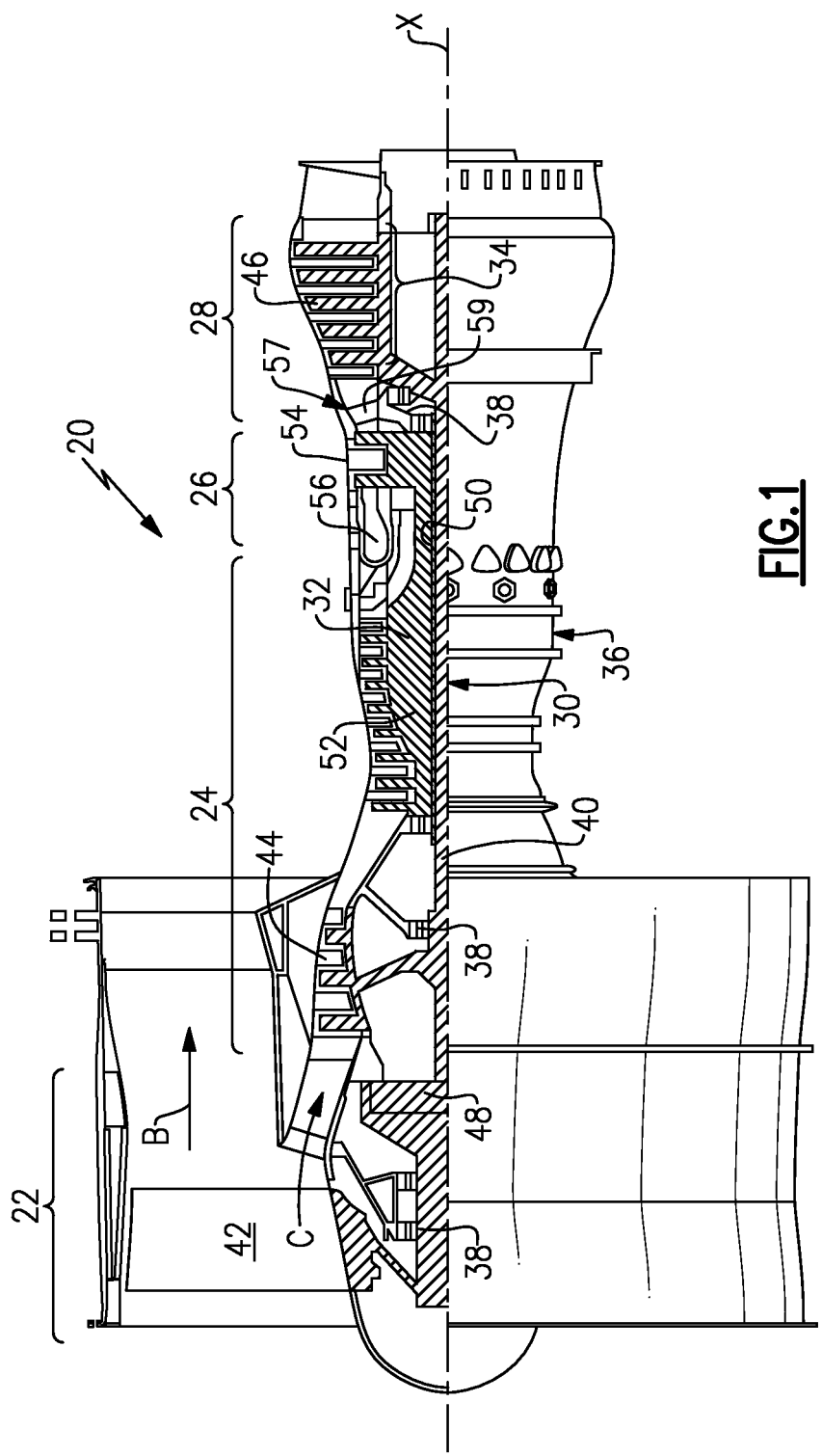
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second (350.5 meters/second).

Figure 2:
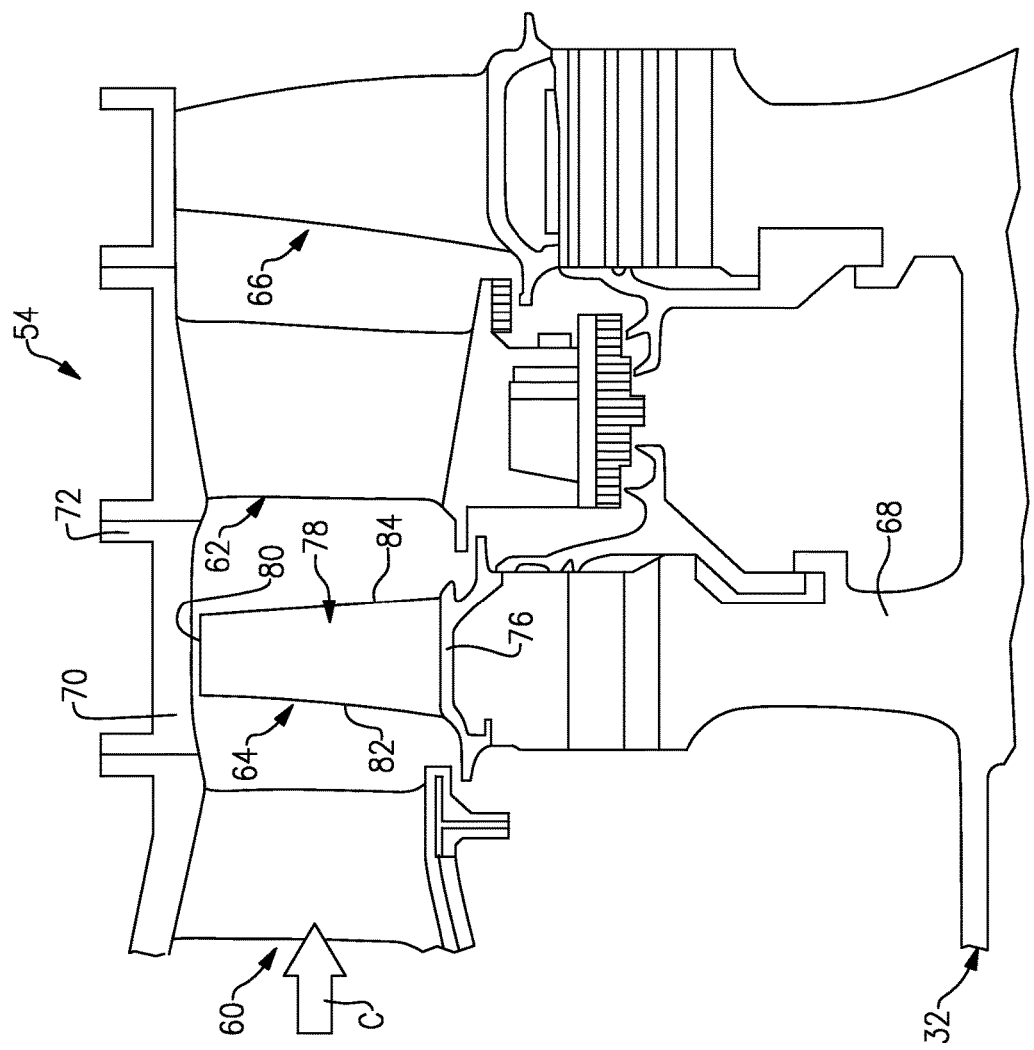
FIG. 2 schematically illustrates a section of the gas turbine engine, such as a turbine section.

Referring to FIG. 2, a cross-sectional view through a high pressure turbine section 54 is illustrated. In the example high pressure turbine section 54, first and second arrays of circumferentially spaced fixed vanes 60, 62 are axially spaced apart from one another. A first stage array of circumferentially spaced turbine blades 64, mounted to a rotor disk 68, is arranged axially between the first and second fixed vane arrays. A second stage array of circumferentially spaced turbine blades 66 is arranged aft of the second array of fixed vanes 62. It should be understood that any number of stages may be used. Moreover, the disclosed airfoil may be used in a compressor section, turbine section and/or fixed or rotating stages.

The turbine blades each include a tip 80 adjacent to a blade outer air seal 70 of a case structure 72, which provides an outer flow path. The first and second stage arrays of turbine vanes and first and second stage arrays of turbine blades are arranged within a core flow path C and are operatively connected to a spool 32, for example.

Figure 3:
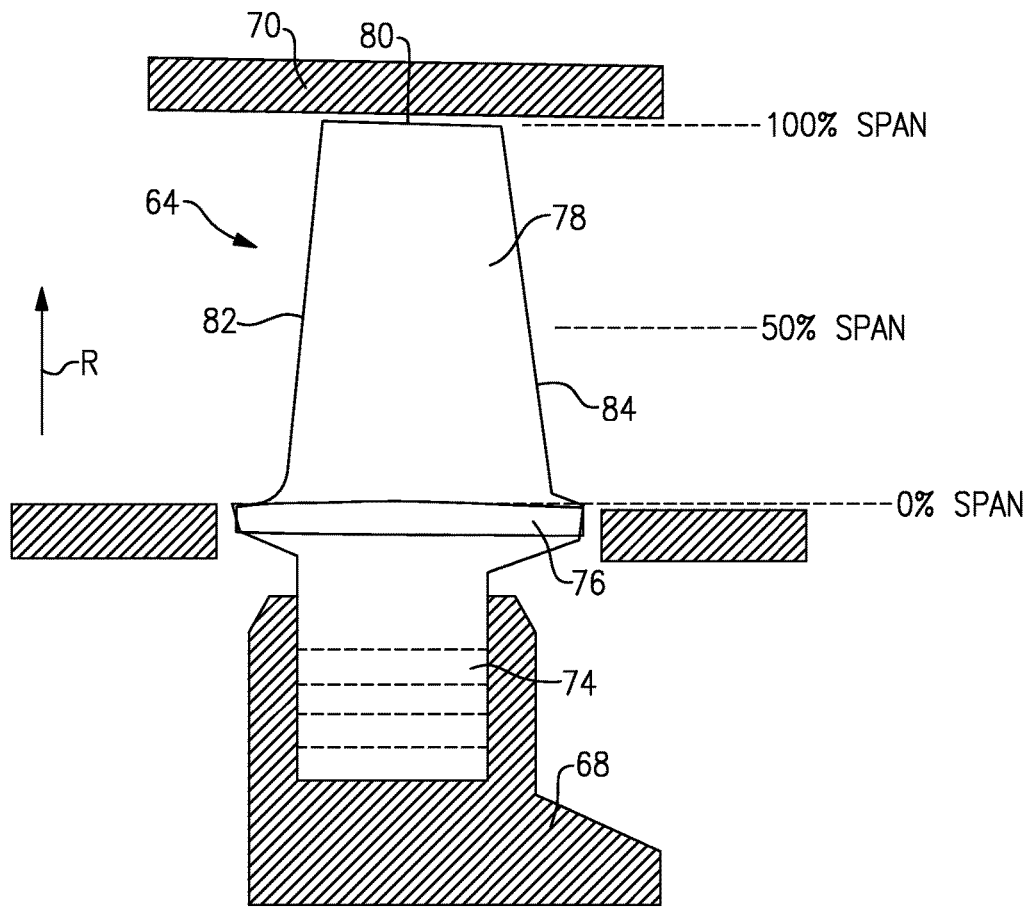
FIG. 3 schematically illustrates a turbine blade.

Each blade 64 includes an inner platform 76 respectively defining inner flow path. The platform inner platform 76 supports an airfoil 78 that extends in a radial direction R, as shown in FIG. 3. It should be understood that the turbine vanes may be discrete from one another or arranged in integrated clusters. The airfoil 78 provides leading and trailing edges 82, 84.

Figure 4:
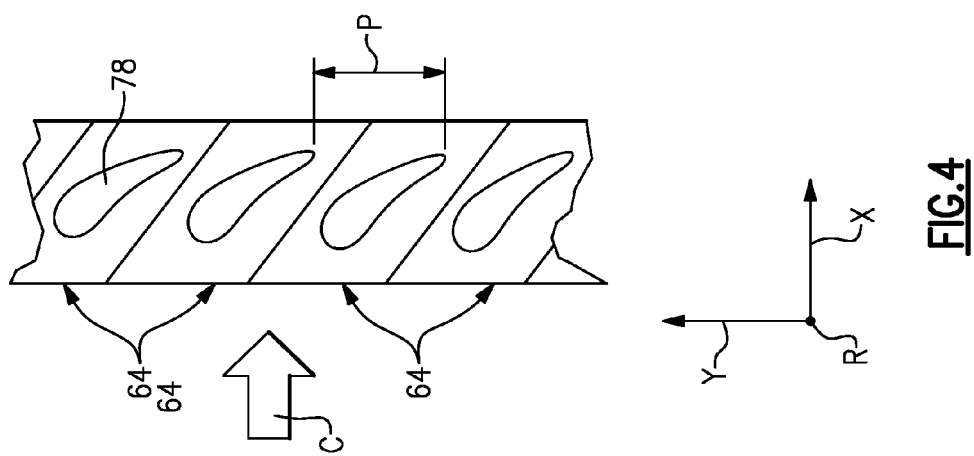
FIG. 4 schematically illustrates a portion of a circumferential array of blades.

The airfoil 78 is provided between pressure (predominantly concave) and suction (predominantly convex) sides 94, 96 in an airfoil thickness direction (FIG. 5), which is generally perpendicular to a chord-wise direction provided between the leading and trailing edges 82, 84. An additional way of distinguishing between pressure and suction side is to compare averaged and integrated values of curvature. Between leading and trailing edges 82, 84, the averaged and integrated curvature is more convex on the suction side compared to the pressure side. Multiple turbine blades 64 are arranged in a circumferentially spaced apart manner in a circumferential direction Y (FIG. 4). The airfoil 78 includes multiple film cooling holes 90, 92 respectively schematically illustrated on the leading edge 82 and the pressure side 94 (FIG. 4).

The turbine blades 64 are constructed from a high strength, heat resistant material such as a nickel-based or cobalt-based superalloy, or of a high temperature, stress resistant ceramic or composite material. In cooled configurations, internal fluid passages and external cooling apertures provide for a combination of impingement and film cooling. Other cooling approaches may be used such as trip strips, pedestals or other convective cooling techniques. In addition, one or more thermal barrier coatings, abrasion-resistant coatings or other protective coatings may be applied to the turbine vane 64.

Figure 5:
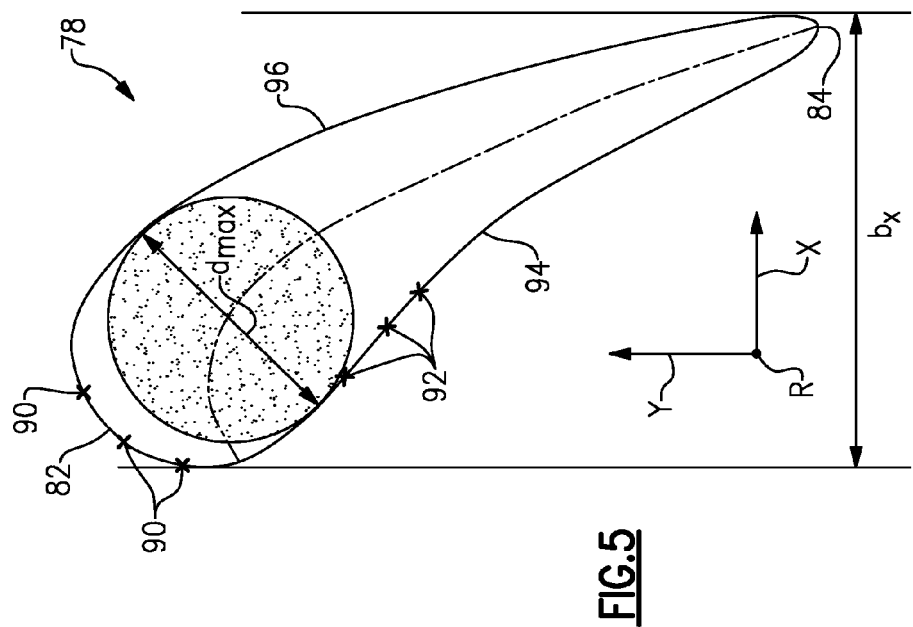
FIG. 5 is a cross-sectional view through an airfoil according to the disclosure.

FIG. 3 schematically illustrates an airfoil including pressure and suction sides joined at leading and trailing edges 82, 84. A root 76 supports the platform 76. A root 74 may include a fir tree that is received in a correspondingly shaped slot in the rotor 68, as is known. The airfoil extends a span from a support, such as an inner platform 76 to an end, such as a tip 80 in a radial direction R. The 0% span and the 100% span positions respectively correspond to the radial airfoil positions at the support and the end. The leading and trailing edges 82, 84 are spaced apart from one another an axial chord $b_x$ (FIG. 5) in the axial direction X. A cross-section of the airfoil 78, as illustrated in FIG. 5, at a particular span location has a pitch p defined as the circumferential distance in Y—direction between adjacent airfoils (FIG. 4). A cross-section of the airfoil 78, as illustrated in FIG. 5, at a particular span location also has a diameter $d_{max}$ tangent to the pressure and suction sides 94, 96. The diameter $d_{max}$ corresponds to the largest circle fitted within the cross-section.

A ratio of the diameter $d_{max}$ to the axial chord $b_x$ is at least 0.4 between 50% and 95% span location. In one example, the span location is between 50% and 70%, and in another example, the span location is between 75% and 95%. In another example, the ratio is at least 0.45, but does not exceed 0.7. In yet another example, the ratio is at least 0.5, but does not exceed 0.65.

In one example, the ratio of the airfoil pitch to the axial chord is between 1.5 and 1.9, and in another example, the ratio of the airfoil pitch to the axial chord is between 1.65 and 1.8.

The cooling holes, such as the cooling holes 90, 92, are provided on various locations of the airfoil 78 to provide a boundary layer of cooling fluid, which protects the airfoil 78 from the hot gases in the core flow path. The disclosed ratio provides desired heat load characteristics as well as desired film cooling performance. In the past, such airfoil designs were not considered since they cause increased weight and pull (for a rotating airfoil). Additional challenges are associated with low Mach numbers in the internal cooling passages. However, airfoils designed with larger thickness near the tip 80 may result in overall performance improvement. The larger diameter reduces the pressure gradient near the leading edge, avoiding undesired flow separation at the leading edge and pressure side.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine comprising:
   a compressor section and a turbine section; and
   a circumferential array of airfoils provided in one of the compressor and turbine sections, each of the airfoils including pressure and suction sides joined at leading and trailing edges, each of the airfoils extends a span from a support to an end in a radial direction, 0% span and 100% span positions respectively correspond to an exterior wall at the support and the end, the leading and trailing edges are spaced apart from one another an axial chord in an axial direction, a cross-section of each of the airfoils at a span location has a diameter tangent to the pressure and suction sides, the diameter corresponds to the largest circle fitting within the cross-section, a ratio of the diameter to the axial chord is at least 0.45 at a 50% span location or greater, and an airfoil pitch defined as a circumferential distance between adjacent airfoils at the 50% span location or greater, wherein a ratio of the airfoil pitch to the axial chord is between 1.5 and 1.9.

2. The gas turbine engine according to claim 1, wherein at least one of the airfoils comprising a root supporting a platform that corresponds to the support, the end providing a terminal end of at least one airfoil.

3. The gas turbine engine according to claim 2, wherein the root includes a fir tree.

4. The gas turbine engine according to claim 1, wherein the ratio of the diameter to the axial chord does not exceed 0.7.

5. The gas turbine engine according to claim 4, wherein the ratio of the diameter to the axial chord is at least 0.5, but does not exceed 0.65.

6. The gas turbine engine according to claim 1, wherein the span location is between 50% and 70%.

7. The gas turbine engine according to claim 1, wherein the ratio of the airfoil pitch to the axial chord is at least 1.6 at 60% span.

8. The gas turbine engine according to claim 1, wherein the span location is between 75% and 95%.

9. The gas turbine engine according to claim 1, wherein the ratio of the airfoil pitch to the axial chord is at least 1.8 at 80% span.

10. The gas turbine engine according to claim 1, wherein the circumferential array of airfoils is provided in the turbine section.

11. The gas turbine engine according to claim 10, wherein at least one of the airfoils includes cooling holes provided on at least one of the leading edge and the pressure side.

12. The gas turbine engine according to claim 1, wherein the ratio of the diameter to the axial chord is at least 0.45, but does not exceed 0.7.

13. The gas turbine engine according to claim 1, wherein the ratio of the airfoil pitch to the axial chord is between 1.65 and 1.8.

14. The gas turbine engine according to claim 1, wherein the airfoil is unshrouded.

15. The gas turbine engine according to claim 10, wherein the circumferential array of airfoils are turbine blades.

* * * * *